March 18, 1947.     R. D. BENNETT     2,417,583
SPEED CONTROL VALVE
Filed June 5, 1943

INVENTOR.
Racy D. Bennett
BY
Pennie Davis Marvin & Edmonds
his ATTORNEYS

Patented Mar. 18, 1947

2,417,583

UNITED STATES PATENT OFFICE 2,417,583

SPEED CONTROL VALVE

Racy D. Bennett, Detroit, Mich., assignor to Vinco Corporation, Detroit, Mich., a corporation of Michigan Application June 5, 1943, Serial No. 489,843

2 Claims. (Cl. 251—152)

This invention relates to hydraulic control valves primarily designed to control the speed of operation of the reciprocating beds of machine tools such, for example, as gear-grinding machines.

In the operation of machine tools it is customary to reciprocate the work-carrying table by means of a horizontal hydraulic cylinder fixed to the frame of the machine and having a piston attached to the table. The operating fluid is usually supplied under constant pressure and the speed of the table regulated by a throttle valve in the discharge pipe from the end of the cylinder. In machines of this type, particularly precision grinders where the working tolerances are very small, the speed of movement of the table must be accurately regulated, and difficulty has been experienced in designing a valve with which small changes in speed can be accurately made.

In my co-pending application Ser. No. 414,368, filed October 9, 1941, I have disclosed a valve which has proven satisfactory for this purpose. This valve, in addition to giving an accurate speed regulation, also serves as a deceleration valve to reduce the speed of the table when it comes to a stop at each end of its reciprocating motion. The valve of the present application is an improvement on the valve disclosed in my abovementioned application, and this application, with respect to such parts as are common to the two applications, is a continuation in part of said copending application Ser. No. 414,368, now Patent No. 2,321,000, granted June 8, 1943.

In principle and operation the valve of the present application is the same as the valve of my former application, but the present valve is simpler, has fewer and more rugged parts, and is preferable from the standpoint of manufacture and assembly. I have therefore limited the claims of my former application to the specific form there disclosed and having included generic claims to the two species in this application.

Figure 1:
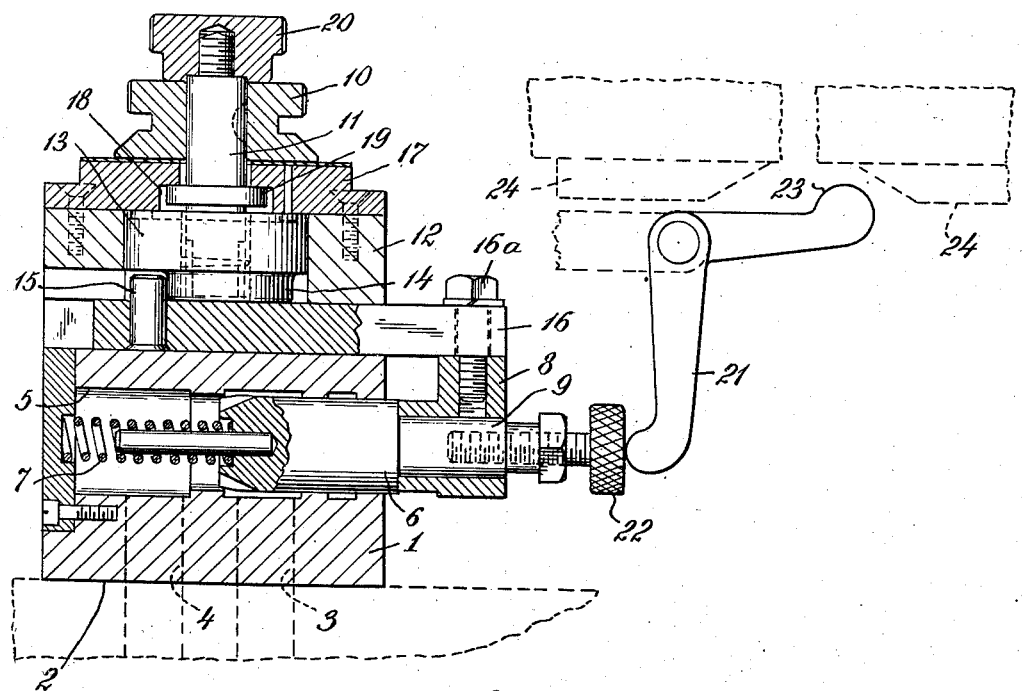
Fig. 1 shows my improved valve in vertical section.
Figure 2:
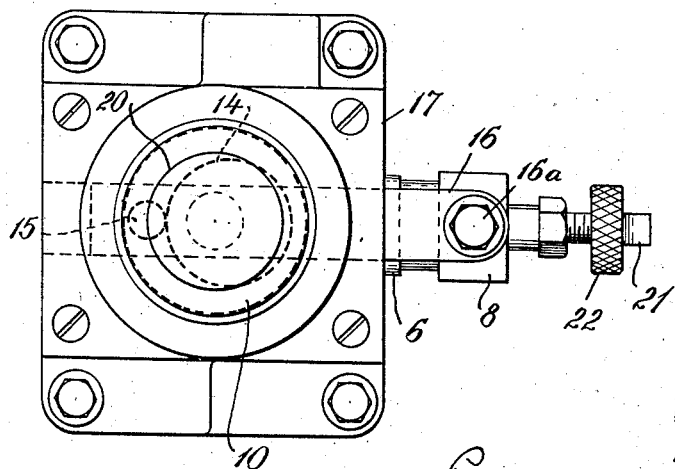
Fig. 2 shows the valve in front elevation.

The valve consists of a valve body 1 which is bolted to the machine frame with its rear wall 2 against a portion of the frame, illustrated in dotted lines and containing fluid passages registering with the passages 3 and 4 of the valve body. The passage 3 is connected to the discharge pipes from the hydraulic cylinder and the passage 4 leads to the sump of the hydraulic system which serves as the supply for the pressure pump.

The valve body 1 has a valve bore 5 extending through the valve body at right angles to the passages 3 and 4, and mounted for reciprocation in the valve bore is a plunger valve 6 which partially closes the passage 3 to thereby restrict the flow of liquid from the passage 3 to passage 4. The end of the piston valve 6 is provided with notches as disclosed in my prior application, to secure a fine adjustment of the area of the fluid passage upon movement of the valve.

The valve 6 is biased by a spring 7 in a direction to open the valve and its adjustment is secured by means of a stop collar 8 surrounding the stem 9 of the valve which, as shown, is of reduced diameter to provide a shoulder abutting against the stop collar 8. The collar 8 has a sliding fit on the stem 9 so that the valve 6 may be shifted from the open position as determined by the position of the collar 8 to closed position against the tension of the spring without altering the position of the collar 8. The accurate positioning of the stop collar is obtained by means of an adjusting knob 10 keyed to a shaft 11 which is mounted for rotation in a plate 12, attached to the front face of the valve body 1. Also keyed to the shaft 11 is an enlarged bearing 13 which accurately centers the shaft in the plate 12. Formed on the face of the bearing 13 adjacent the valve body is an eccentric 14 which is engaged by a pin 15 mounted in the end of a bar 16 attached to the stop collar 8. The bar 16 is mounted for reciprocation in a grooved cut in the face of the valve body and is connected to the stop collar through a pivot bolt 16a to permit such slight freedom of movement as may be necessary to prevent binding.

The front face of the bearing 13 is covered by a cover plate 17 which is recessed on its inner face as shown at 18, to receive a collar 19 on the shaft 11. The shaft 11 projects beyond the knob 10 and is threaded on its outer end to receive a clamping knob 20, whereby the shaft may be clamped to the plate 17 and firmly held in adjusted position.

In order to reduce the speed of the table as it approaches the end of its movement the valve 6 is shifted by the movement of the table in a direction to close the valve (toward the left as shown in Fig. 1) as the table approaches the end of its movement. To this end there is pivoted on the machine frame adjacent the end of the valve 6 a bell crank lever 21 one end of which presses against an adjusting screw 22 set in the end of the valve stem 9. The horizontal arm of the bell crank 21 is provided with a cam face 23 to adapt it to be engaged and depressed by adjustable trip bars 24 carried by the machine table.

When the arm 23 is depressed at the end of the table movement the valve 6 will be shifted to the left, as shown in Fig. 1, thereby further closing the valve to whatever extent may be desired, depending upon the adjustment of the knob 22. The further closing of the valve restricts the discharge passage 3 of the hydraulic cylinder and reduces the speed of the table. The movement of the valve body in thus decelerating the speed of the table, does not in any way affect the adjustment of the valve, for the eccentric 14 is firmly held in clamped position, and when the pressure on the end of the adjusting knob 22 is relieved the spring 7 will restore the valve to the exact position to which it has been adjusted by the knob 19.

The valve contains few parts of simple, rugged construction, and the adjustable parts are proportionately of large size so that minute adjustments may be accurately obtained.

The construction shown has been found to give accurate speed regulation over a wide range and to decelerate the speed of the table smoothly and without vibration. It is to be understood, however, that the invention is not limited to the structural details disclosed except insofar as recited in the appended claims.

I claim:

1. In a control valve the combination of a valve body having a valve bore therein, ports in said valve body connecting with said valve bore at separated points longitudinally thereof, a valve member mounted for reciprocation longitudinally of said valve bore and adapted upon movement in one direction to reduce the passageway between said ports and in the opposite direction to open said passageway said valve member having a reduced portion at one end and a shoulder at the junction of said reduced portion and the other part of said valve member, a spring for moving said valve member in a direction to open said passageway valve operating means engaging said valve member for moving the same in opposition to said spring, an adjustable stop independent of said valve and said valve operating means for limiting the movement of said valve under the action of said spring, said stop comprising a collar mounted on said reduced portion of the valve member adjacent said shoulder for longitudinal movement independent thereof, an eccentric mounted for rotation on said valve body, connections between said eccentric and said collar whereby rotation of the eccentric moves the collar longitudinally of the valve body, and means for locking said eccentric in adjusted position.

2. In a control valve the combination of a valve body having a valve bore therein, ports in said valve body connecting with said valve bore at separated points longitudinally thereof, a valve member mounted for reciprocation longitudinally of said valve bore and adapted upon movement in one direction to reduce the passageway between said ports and in the opposite direction to open said passageway said valve member having a reduced portion at one end and a shoulder at the junction of said reduced portion and the other part of said valve member, a spring for moving said valve member in a direction to open said passageway valve operating means engaging said valve member for moving the same in opposition to said spring, an adjustable stop independent of said valve and said valve operating means for limiting the movement of said valve under the action of said spring, said stop comprising a collar mounted on said reduced portion of the valve member adjacent said shoulder for longitudinal movement independent thereof, an eccentric mounted for rotation on said valve body, a bar mounted on said valve body adjacent said eccentric and movable in parallelism with said valve, a pin on said bar engaging said eccentric, a connection between said bar and said collar whereby rotation of the eccentric moves the collar longitudinally of the valve body, and means for locking said eccentric in adjusted position.

RACY D. BENNETT.

REFERENCES CITED

The following references are of record in the file of this patent:

UNITED STATES PATENTS

| Number | Name | Date |
|---|---|---|
| 2,275,624 | Hann | Mar. 10, 1942 |
| 2,277,075 | Dahl | Mar. 24, 1942 |
| 2,293,903 | Johnson | Aug. 25, 1942 |
| 2,317,063 | Johnson | Apr. 20, 1943 |